(12) United States Patent
Bae

(10) Patent No.: US 7,533,913 B2
(45) Date of Patent: May 19, 2009

(54) FRONT STRUCTURE FOR CAR BODY

(75) Inventor: Ki-Soon Bae, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 217 days.

(21) Appl. No.: 11/648,814

(22) Filed: Dec. 28, 2006

(65) Prior Publication Data

US 2008/0116719 A1  May 22, 2008

(30) Foreign Application Priority Data

Nov. 21, 2006  (KR) .................. 10-2006-0115169

(51) Int. Cl.
*B60R 19/34* (2006.01)
(52) U.S. Cl. .................. 293/133; 293/132; 293/154; 296/187.09
(58) Field of Classification Search .................. 293/132, 293/133, 154, 155; 296/187.09, 193.09, 296/203.02
See application file for complete search history.

(56) References Cited

U.S. PATENT DOCUMENTS

2002/0063433 A1  5/2002  Gotanda et al.
2008/0106107 A1*  5/2008  Tan et al. .................. 293/133

FOREIGN PATENT DOCUMENTS

| JP | 8276804 | 10/1996 |
| JP | 2004203202 | 7/2004 |
| JP | 2005001431 | 1/2005 |
| JP | 2005001462 | 1/2005 |
| JP | 2005178417 | 7/2005 |

* cited by examiner

*Primary Examiner*—Lori L Lyjak
(74) *Attorney, Agent, or Firm*—Morgan, Lewis & Bockius LLP

(57) ABSTRACT

A front structure for a car body that reduces time and cost to repair a car body after a collision by localizing damage in low-speed collisions to a crash box mounted in a space between a front bumper and a side member and making the car body deform always in a predetermined mode in the collisions. A front structure for a car body may include a first connecting bracket supporting the left and right rear of a front bumper, a crash box joined to the rear of the first connecting bracket, a second connecting bracket joined to the rear of the crash box, and a front side member joined to the rear of the second connecting bracket. The crash box includes an inner member and an outer member, which are curved and separated from each other, so as to extend in the longitudinal direction of the vehicle and have a closed cross section. The inner member has a plurality of bead-shaped protrusions that are formed across the inner member and longitudinally spaced from each other.

6 Claims, 3 Drawing Sheets

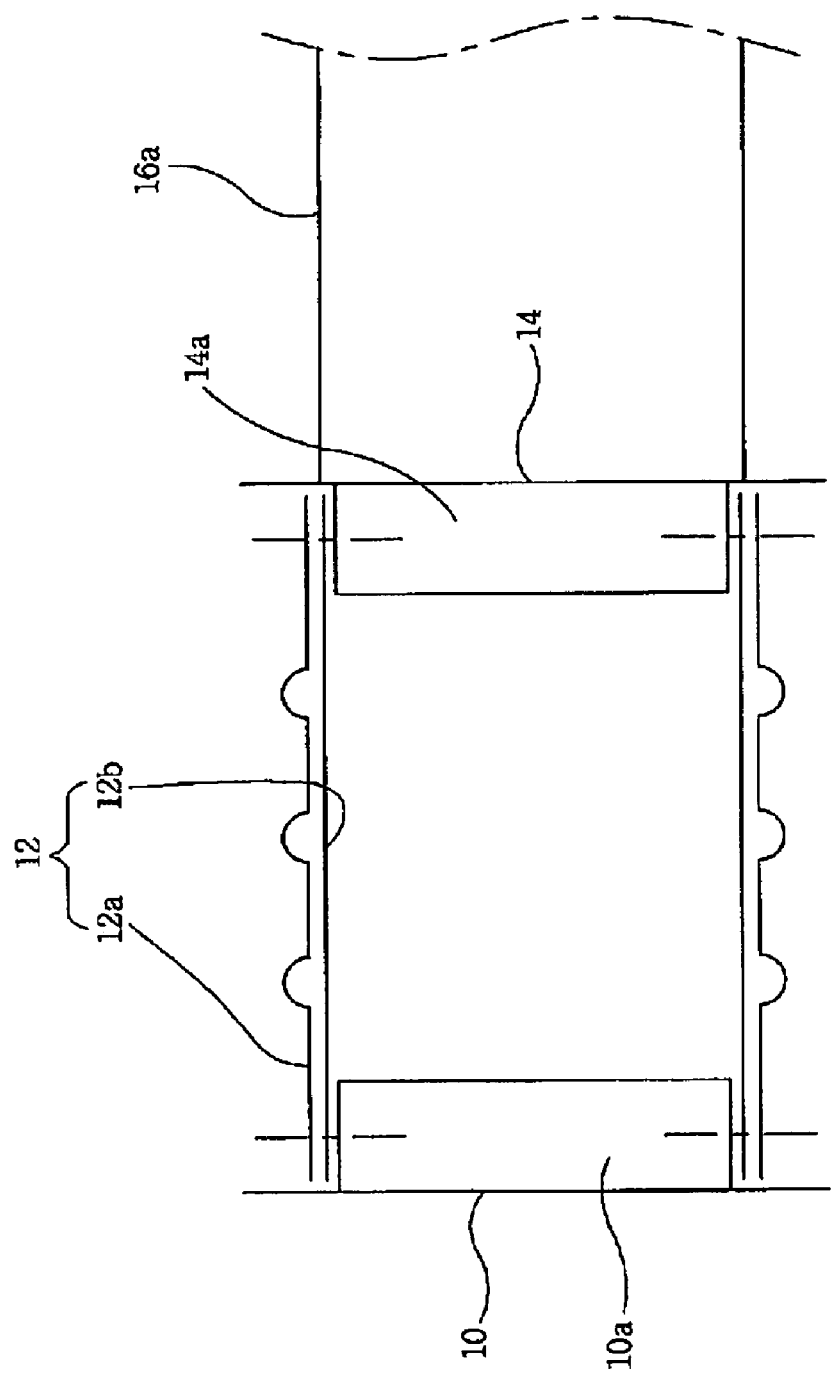

FRONT STRUCTURE FOR CAR BODY

CROSS-REFERENCE TO RELATED APPLICATIONS

The present application is based on, and claims priority from, Korean Application Serial Number 10-2006-0115169, filed on Nov. 21, 2006, the disclosure of which is hereby incorporated by reference herein in its entirety.

FIELD OF THE INVENTION

The present invention relates to a front structure for a car body and, more particularly, to a front structure including a crash box that is mounted in a space between a front bumper and front side member and absorbs striking energy to reduce damage of a vehicle in low-speed collisions.

BACKGROUND OF THE INVENTION

Manufacturers of vehicles have made significant investments in improving safety in recent years, that is, much effort has been made to reduce loss due to damage of vehicle and injury of passengers, particularly in preparation for a collision.

For example, collisions of vehicles are largely classified into a high-speed collision above 40 km/h and a low-speed collision below 15 km/h. Car bodies are designed in the focus on reducing injury of human body in high-speed collisions, but in the focus on reducing the amount of deformation of car bodies in low-speed collisions.

In particular, a specific part, a crash box having a rectangular closed cross-sectional space inside is provided between a front bumper and a front side member to minimize deformation of a car body at low-speed collisions. Because crash boxes in the related art had to be designed with low stiffness to effectively absorb striking energy at low-speed collisions, not only they could not have sufficient stiffness for high-speed collisions, but also deformation due to a collision was not localized to the crash boxes and progresses to the front side member.

Further, crash boxes in the related art had to be essentially modified in the designs such as increasing closed cross section, thickness of materials, and length of members to absorb striking energy at high-speed collisions on account of their simplicity in the shapes.

However, since the increase of the closed cross section, thickness, and length for crash boxes in the related art is an important matter that changes the whole external shape of the front of a car body, it does not agree with an intention that is to effectively absorb striking energy at a limited space.

SUMMARY OF THE INVENTION

Embodiments of the present invention provide a front structure for a car body to minimize time and cost to repair a car body after a collision by localizing damage in low-speed collisions to a crash box mounted in a space between a front bumper and a side member and making the car body deform always in a predetermined mode in the collisions.

In one exemplary embodiment, a front structure for a car body includes a first connecting bracket, a crash box, a second connecting bracket, and a front side member. The first connecting bracket supports the left and right rear of a front bumper. The crash box is joined to the rear of the first connecting bracket. The second connecting bracket is joined to the rear of the crash box. The front side member is joined to the rear of the second connecting bracket. The crash box includes an inner member and an outer member curved, which are curved and separated from each other, so as to extend in the longitudinal direction of the vehicle and have a closed cross section. The inner member has a plurality of bead-shaped protrusions formed across the inner member and longitudinally spaced from each other.

BRIEF DESCRIPTION OF THE DRAWINGS

For a better understanding of the nature and objects of the present invention, reference should be made to the following detailed description with the accompanying drawings, in which:

FIG. 3 is a vertical cross-sectional view of FIG. 1.

DETAILED DESCRIPTION OF THE PREFERRED EMBODIMENTS

Hereinafter, a detailed description will be given of the present invention.

Figure 1:
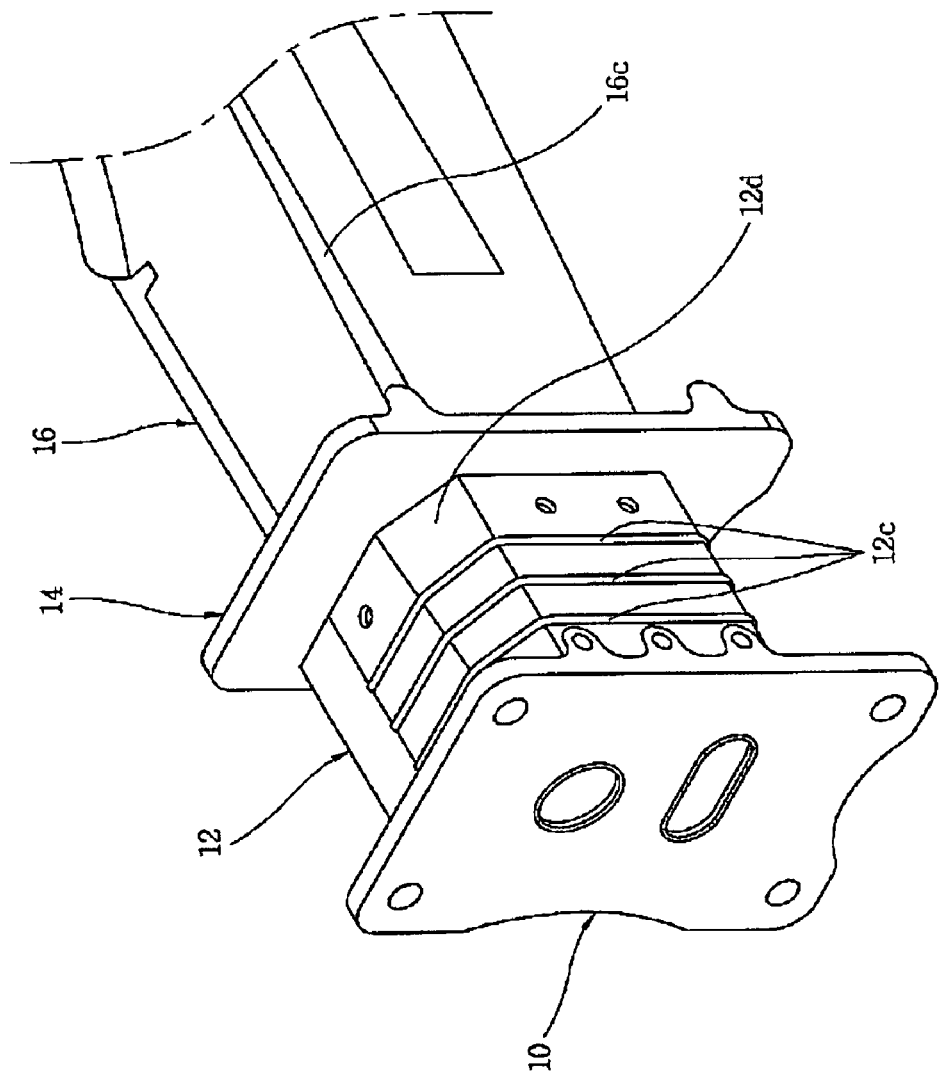
FIG. 1 is a perspective view of a front structure for a car body according to an embodiment of the invention.
Figure 2:
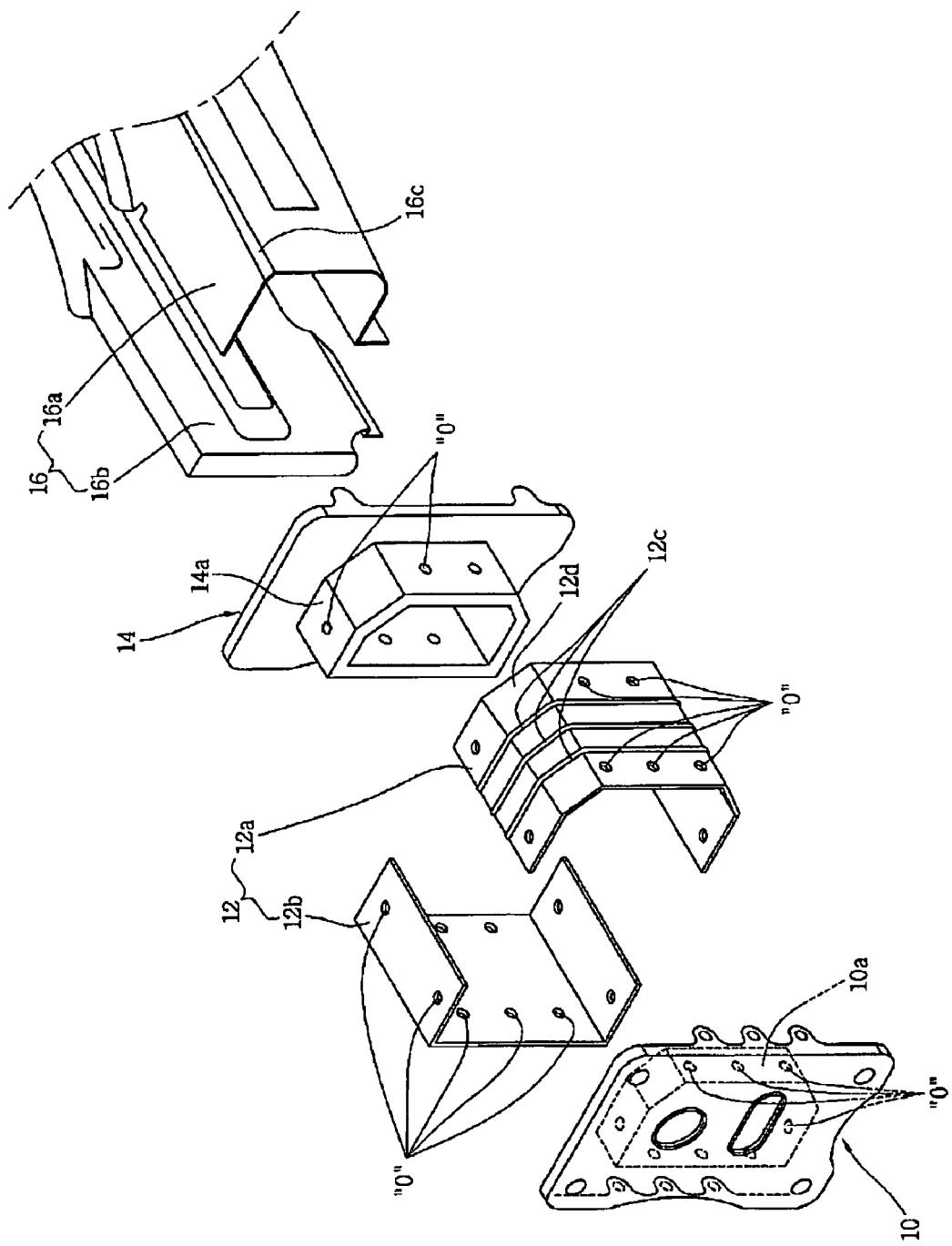
FIG. 2 is a perspective exploded perspective view of FIG. 1.

As shown in FIG. 1, a front structure for a car body includes an first connecting bracket 10 supporting the rear of a front bumper (not shown) at the left and right front ends of the front bumper, a crash box 12 detachably joined to the rear of first connecting bracket 10, a second connecting bracket 14 detachably joined to the rear of crash box 12, and a front side member 16 joined to the rear of second connecting bracket 14.

Crash box 12 includes an inner member 12a and outer member 12b, which are curved and separated from each other, so as to extend in the longitudinal direction of the vehicle and have a closed cross section. Inner member 12a has a plurality of bead-shaped protrusions 12c formed across it and longitudinally spaced from each other. Inner member 12a and outer member 12b are joined by welding, with upper and lower portions overlapped, and form a closed cross-sectional space having a predetermined volume inside. Bead-shaped protrusion 12c has a convex cross section outside, which facilitates longitudinal deformation by load applied in the longitudinal direction of inner member 12a.

In addition, bead-shaped protrusions 12c are spaced from each other at equal distances from a position at a predetermined distance from the front end of inner member 12a, toward the rear end. The distance between bead-shaped protrusions 12c is set such that inner member 12a can absorb striking energy that initially generates in a low-speed collision through its stiffness. The distance is determined by analysis considering the shape and properties, such as length, thickness, and material of a member. Inner member 12a has first chamfers at the upper and lower edges that gradually longitudinally increase in area from the front to the rear. Accordingly, the closed cross-sectional space inside crash box 12 also gradually increases in cross-sectional area from the front end to the rear end.

Front side member 16 has second chamfers 16c that gradually decreases in area from the front to the rear, corresponding to first chamfers 12d of inner member 12a. Accordingly, a closed cross-sectional space inside front side member 16 also decreases in cross-sectional area from the front end to the rear end. Front side member 16 includes an inner member 16a and an outer member 16b curved to dividably form the closed cross-sectional space inside and outside in the longitudinal direction of the car body. Second chamfers 16c are formed at upper and lower edges of inner member 16a.

A first protruding part 10a for join with crash box 12 is integrally formed with first connecting bracket 10. Several through holes 0 for threaded-fastening are formed around the whole circumferences of first protruding part 10a of first connecting bracket 10 and the front portions of inner and outer members 12a and 12b of crash box 12.

A second protruding part 14a for join with crash box 12 is integrally formed with second connecting bracket 14. Several through holes 0 for threaded-fastening are formed around the whole circumferences of second protrusion 14a of second connecting bracket 14 and the rear portions of inner and outer members 12a and 12b of crash box 12. Accordingly, crash box 12 deforms outside the vehicle in a low-speed collision, which is enabled by bead-shaped protrusions 12c formed across inner member 12a and longitudinally spaced from each other. Bead-shaped protrusions 12c of inner member 12a causes longitudinal compressing deformation to the member by striking energy created in a low-speed collision. As a result, as the length of inner member 12a decreases in comparison with outer member 12b, crash box 12 deforms generally outside the vehicle by bead-shaped protrusions 12c. When crash box 12 deforms after a low-speed collision, the rear end directs outside a vehicle compared with the front end. The deformation prevents striking energy created by the collision from being transmitted inside the vehicle, so that it plays a significant role in reducing deformation that makes the engine and transmission pushed inside the vehicle. Further, the deformation of the front of a car body in a low-speed collision is localized to crash box 12 due to the characteristics in the shape of first chamfers 12d of crash box 12 and second chamfers 16c of side member 16, and deformation of front side member 16 is restrained.

The above action is enabled because the closed cross-sectional space of crash box 12 expands toward the rear by first chamfers 12d and the closed cross-sectional space of front side member 16 also expands toward the front by second chamfers 16c, in addition, striking energy created in a low-speed collision is absorbed into bead-shaped protrusions 12c of inner member 12a of crash box 12 through the deformation and then effectively blocked by second chamfers 16c having an area expanding toward the front of front side member 16. In other words, deformation of the front of a car body due to a low-speed collision localized to crash box 12 between first and second connecting brackets 10 and 14, so that it provides an advantage of only having to replace crash box 12 in repairing the front of the body from now on.

As described above, according to a front structure for a car body of the embodiment of the invention, since deformation in a low-speed collision can be localized to the crash box through the chamfers of the crash box and the front side member and the bead-shaped protrusions of the inner member of the crash box, it is possible to minimize time and cost to replace parts in repairs.

Further, since the crash box is assembled by threaded-fastening with the connecting brackets between the front bumper and the front side member, work efficiency is considerably improved in replacing parts compared with existing assemblies by welding.

What is claimed is:

1. A front structure for a car body, comprising:
    a first connecting bracket configured to support the car body from impact;
    a crash box joined to the rear of the first connecting bracket;
    a second connecting bracket joined to the rear of the crash box; and
    a front side member joined to the rear of the second connecting bracket,
    wherein the crash box includes an inner member and an outer member, which are curved and separated from each other, so as to extend in the longitudinal direction of the vehicle and have a closed cross section, and
    the inner member includes a plurality of bead-shaped protrusions formed across the inner member and longitudinally spaced from each other,
    wherein a first protruding part for joining with the crash box is integrally formed with the first connecting bracket.

2. The front structure as defined in claim 1, wherein first chamfers longitudinally and gradually increasing in area from a front to a rear are formed at upper and lower edges of the inner member.

3. The front structure as defined in claim 2, wherein second chamfers longitudinally and gradually increasing in area from the front to the rear are formed at the upper and lower edges of the front side member, corresponding to first chamfers of inner member.

4. The front structure as defined in claim 3, wherein:
    the front side member includes an inner member and an outer member curved to dividably form a closed cross-sectional space inside and outside in the longitudinal direction of a vehicle, and
    the second chamfers are formed at the upper and lower edges of the inner member.

5. The front structure as defined in claim 1, wherein a second protruding part for joining with the crash box is integrally formed with the second connecting bracket.

6. The front structure as defined in claim 5, wherein several through holes for threaded-fastening are formed around the whole circumferences of the first protruding part of the first connecting bracket and the front portions of the inner and outer members of the crash box, and the second protrusion of the second connecting bracket and the rear portions of the inner and outer members of the crash box.

* * * * *